UNITED STATES PATENT OFFICE.

PERRY WALTER BELANGEE, OF WATERLOO, IOWA, ASSIGNOR OF ONE-HALF TO LAFAYETTE COLTRIN, OF LONG BEACH, CALIFORNIA.

METHOD OF TREATING SPINED CACTUS.

1,199,864.  Specification of Letters Patent.  Patented Oct. 3, 1916.

No Drawing.  Application filed March 8, 1916. Serial No. 82,967.

*To all whom it may concern:*

Be it known that I, PERRY WALTER BELANGEE, a citizen of the United States, residing at Waterloo, in the county of Blackhawk, State of Iowa, have invented new and useful Improvements in Methods of Treating Spined Cactus, of which the following is a specification.

This invention relates to a method of treating spined cactus for the purpose of making an edible food thereof for stock, as for cattle, etc.; and the invention embodies that certain method hereinafter pointed out by which, in a simple direct and economical manner, I prepare spined cactus for use as a stock food.

It has been heretofore proposed to grow a spineless variety of cactus to be used for stock food; but the most prevalent variety of cactus has always been the spined variety; and it has also been found that the spineless variety has a tendency to revert to the original spined type.

It is an object of my invention to provide a method by which the enormous growth of wild or natural spined cactus, or cultivated artificial growth of spined cactus, may be treated so as to be useful as stock food.

The hard, sharp spines of the cactus have always heretofore been the factor preventing the ready use of the spined cactus as food; and I am aware that it has been proposed to burn off the spines or to pull them out of the cactus by physical means, but such means have not been practically successful. However, I have discovered a method of procedure by which the spines of cactus may be treated in large quantities and at a small cost to produce a pulpy, moist product of very great nutritious qualities for cattle, etc.

In carrying out my method I gather the cactus by any suitable means and then disintegrate it by any suitable machinery which will disintegrate the body of the cactus and also disintegrate the spines. This disintegration may be had by grinding, cutting, shredding or crushing or otherwise treating the cactus, provided only that spines are crushed or disintegrated or broken open so as to expose their interiors to the action of the liquid of the pulp which is formed when the cactus is disintegrated. I have found that when the spines are disintegrated or broken or cut open in any such manner and their interiors are exposed to the liquid of the cactus, this liquid of the cactus has the power of softening the spines within a comparatively short time; so short, in fact, that the cactus can be gathered and disintegrated and fed to the stock in a single day's time, or less.

I do not limit myself to any particular method of disintegration, excepting that disintegration must be such as to disintegrate the cactus and reduce it to a moist, pulpy mass, so as to more or less free its liquid, and such as to open the spines so as to expose their hollow and soft interiors. When this is done, and the broken spines are exposed to the liquid of the pulp, which is accomplished by merely allowing the spines to remain in the pulp, then the spines are immediately softened by the action of that liquid.

The cactus may be softened by steaming, boiling or like action either before or after disintegration; but this is not a necessary feature of my method.

The material resulting from cactus treated by my method has a gelatinous appearance and is more or less wet and somewhat sticky. There is no free water which will run off from a mass of the substance, and it may be kept a long time without deterioration. It does not sour or ferment; and it does not dry out after long exposure. Although it may be fed to stock almost immediately after disintegration, it is not necessary to do so as the food will keep intact and in good condition for a long time. With my method of treatment I not only make it possible to use vast amounts of spined cactus which grow naturally and wild, and which is now worthless and which may be grown on land which is not now useful for any other purpose; but I also make a stock food which contains valuable ingredients not contained in any other food. For instance, in the spineless cactus there is comparatively little fiber; while in my specially prepared food from spined cactus there is a larger proportion of fiber. A certain proportion of fiber is very desirable in food for cattle and like animals, and the disintegrated softened spines in my stock food provide this very desirable element. The food can be fed with or without addition or mixture of other food products, such as bran, grain, hay, grasses, etc. Either by itself or mixed with other foods it forms a valuable nutritious and wholesome stock food.

With my method I make available for use a natural product (or artificial product) which has heretofore gone entirely to waste as it has heretofore been impossible to use spined cactus to any practicable and valuable extent. There are vast expanses of cactus growing in natural state; and there are also vast expanses which may be planted to cactus. The cactus absorbs water from the soil of dry regions and its mass contains so high a percentage of water that my stock food supplies cattle, hogs, etc., with sufficient water for healthy sustenance as well as with a healthful food. Immense acreage, heretofore worthless, can therefore be directly used for supporting such animals without the necessity of water development or supply. As a consequence, the utilization of cactus according to my invention has a very great economic value.

Having described the preferred form of my invention, I claim:

1. The herein described method of treating spined cactus, comprising disintegrating the cactus and disintegrating the spines, and exposing the disintegrated spines to the liquid of the disintegrated cactus.

2. The herein described method of treating spined cactus, comprising disintegrating the cactus and disintegrating the spines, and exposing the disintegrated spines to the wet pulp of the disintegrated cactus.

3. The herein described method of treating spined cactus, comprising disintegrating the cactus and disintegrating the spines, and exposing the disintegrated spines to the wet pulp of the disintegrated cactus, so as to soften the spines and render them edible.

4. The herein described method of treating spined cactus, comprising softening the cactus by heating in water, disintegrating the cactus and disintegrating the spines, and exposing the disintegrated spines to the liquid of the disintegrated cactus so as to soften the spines and render them edible.

In witness that I claim the foregoing I have hereunto subscribed my name this 3rd day of March, 1916.

PERRY WALTER BELANGEE.

Witnesses:
LAFAYETTE COLTRIN,
JAMES T. BARKELEW.

Copies of this patent may be obtained for five cents each, by addressing the "Commissioner of Patents, Washington, D. C."